(No Model.)
B. E. VAN AUKEN.
STEAM TRAP.
No. 478,037. Patented June 28, 1892.
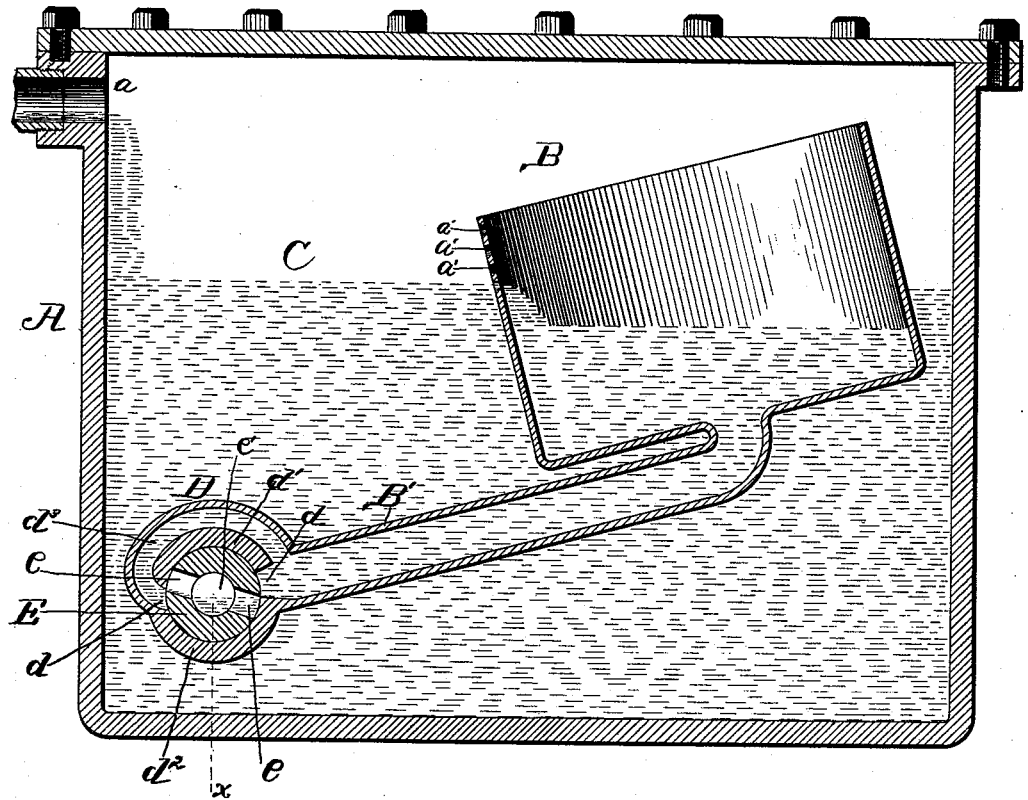
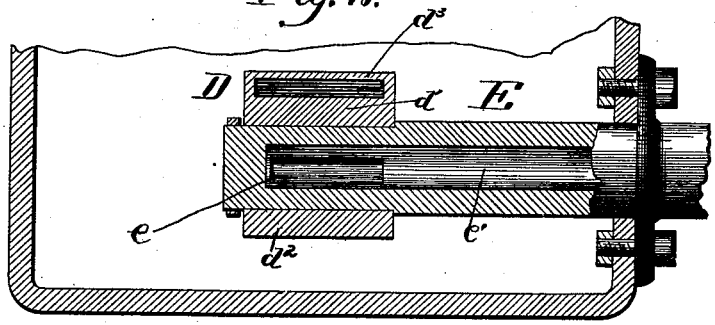
Witnesses.
W. D. Middleton
M. M. Wagner
Inventor
Byron E. Van Auken
By Chas. G. Page
Atty
THE NORRIS PETERS CO., PHOTO-LITHO., WASHINGTON, D. C.

UNITED STATES PATENT OFFICE.

BYRON E. VAN AUKEN, OF CHICAGO, ILLINOIS, ASSIGNOR, BY MESNE ASSIGNMENTS, TO THE VAN AUKEN STEAM SPECIALTY COMPANY, OF SAME PLACE.

STEAM-TRAP.

SPECIFICATION forming part of Letters Patent No. 478,037, dated June 28, 1892.

Application filed August 11, 1891. Serial No. 402,360. (No model.)

*To all whom it may concern:*

Be it known that I, BYRON E. VAN AUKEN, a citizen of the United States, residing at Chicago, in the county of Cook and State of Illinois, have invented a certain new and useful Improvement in Steam-Traps, of which the following is a specification.

My invention relates to steam-traps for discharging the water of condensation from steam-heating apparatus and analogous service.

The object of my invention is to provide a self regulating or equalizing trap adapted for a constant and steady discharge proportional to and during the flow of water from the steam-heating apparatus into the trap and to avoid steam locking the trap when the same is subjected to steam-pressure.

In carrying out my invention I provide an open float or floating receptacle having one or more side openings forming a restricted side portage for the inflow of water from a body of water normally contained within the trap-chamber and sustaining the float. I also provide a valved discharge-port, which is opened and closed by a balance-valve connected with and controlled by the float, the arrangement being such that the float will receive and discharge through the valved discharge-port a stream of water proportional to the flow into the trap-chamber. The float is preferably carried by a vibratory stem or arm, which is provided with a passage for conducting the flow of water from the float to the valved discharge-port, and which also serves as a means for operating the discharge-port valve from the float.

Prior to my invention various constructions of steam-traps comprising valves and floats for operating the same have been provided; but in of all such constructions known to me the float will not maintain itself in position to permit a constant discharge from the trap proportional to and synchronously with a steady or constant inflow into the same. United States Letters Patent No. 269,656, No. 299,809, and No. 401,545, and also British Letters Patent No. 989, of 1886, and No. 7,522, of 1884, all afford illustrations of traps in which the discharge will be intermittent, but not constant. With regard to the steam-traps shown in said United States Letters Patent no assumption is of course made that the discharge will be constant. The defect in the traps disclosed by said British Letters Patents is that the valve will under steam-pressure be locked open, and hence a constant discharge proportional to the inflow into the trap cannot be maintained. The presence of a balance-valve in a construction of trap such as disclosed by United States Letters Patent No. 269,656 will not, as a matter of course, adapt the trap for a constant discharge simultaneously with and proportional to the flow into the trap, nor will the presence of side openings forming a restricted side portage in the float adapt a trap of the construction shown in either of said British Letters Patent to maintain a constant discharge synchronously with and proportional to the flow into the trap; but by combining the vibratory float-chamber having a restricted side portage with a balance-valve I provide a trap adapted for a constant discharge simultaneously with and proportional to the inflow of water into the trap.

In the accompanying drawings, Figure 1 represents in vertical central section a steam-trap embodying the principle of my invention. Fig. 2 is a vertical section through a portion of the same on a plane indicated by line $x$.

A indicates the trap-chamber, which is supplied through an inlet $a$ and intended to normally contain a body of water. The vibratory float B may be described as an open float or floating receptacle provided with one or more graduated side ports or openings $a'$, arranged to admit a flow of water from the body of water within the trap-chamber, the float being arranged for discharging the water thus received through a valved discharge port or outlet, which is governed by the position of the float. The passage from the float to the discharge-port is preferably formed through a hollow vibratory arm B', formed as an extension of the float or float-chamber, the arrangement being such that when the float rises to a certain height the valved discharge-port will close, while, on the other hand, when the float sinks to a certain exent the valved discharge-port will open.

As a means of admitting water into the float I provide said float with a restricted side portage formed by a vertically-arranged slot or a series of comparatively small inlet ports or openings arranged through its side and adapted to permit water to flow into the float when the latter sinks to a sufficient depth, it being observed that, while I have herein shown the float as being open at the top, it derives its supply through its restricted side portage, according to the depth at which it sinks into the body of water, (indicated at C.)

The float controls and operates a balance-valve D, which in turn regulates the area of discharge-portage. The hollow arm B', which forms an extension of the float-chamber, is provided with or adapted to provide a valve-chamber arranged to oscillate upon a stem E, having oppositely-arranged ports $e$, corresponding with the oppositely-arranged ports $d$ of the valve-chamber, which latter is, as seen, in effect an extension of the float-chamber. The hollow stem E provides a discharge-passage $e'$, leading from ports $e$, and it further provides a seat whereon the inner bearing portions $d'$ $d^2$ of the valve-chamber are fitted to turn, it being observed that the hollow arm B' is desirably provided with an end enlargement adapted to provide said valve-chamber. As a preferred and special arrangement the said end enlargement of the arm B' is formed with the bearing portions $d'$ and $d^2$, ports $d$ between said bearing portions, and a part annular passage $d^3$, opening at one end at the point where the passage through arm B' communicates with one of the ports $d$ and at its remaining end terminating in the remaining one of the ports $d$, the result being that said passage $d^3$ is in effect a prolongation of the passage through arm B'.

From the foregoing it will be apparent to those skilled in the art to which my invention appertains that various other forms and modifications of balance-valves embodying the principle herein involved could be readily provided, and hence I do not limit myself to the particular form of balance-valve shown, but may use other forms and arrangements of balance-valves and floats.

The operation of the float is illustrated in Fig. 1, wherein a small stream of water is represented as flowing into the trap-chamber from its inlet $a$ and streams of like proportion respectively entering the float and passing from the hollow float-arm into the outlet-port, which latter is open at its receiving end proportionally to the volume of the stream discharging from the hollow float-arm, it being understood that the side port or ports of the float are graduated or restricted with reference to the discharge from the float—that is to say, made of such size that the flow of water into the float will be comparatively moderate and not in excess of the discharge. As long as there is a flow of water into the trap-chamber there will be a like flow into the float and from the latter into the discharge-port by the way of its hollow arm, since there will be a balance so maintained on the part of the float as to keep its allotted valved discharge-port open proportionally to such flow. Should, for example, the inflow of water into the trap-chamber cease, there would be sufficient outflow from the float to permit it to rise and place its lowest inlet-opening (or the lowest portion of its inlet-opening if the same is made in the form of a slot, as it can be formed) just above the level of the body of water normally occupying the trap-chamber. Upon the resumption, however, of a flow of water into the trap-chamber the float will rise until it reaches the limit of its upward movement, and then water will commence to flow into and so fill the float as to cause it to sink and again open the valved port, which will be kept open by the float as long as there is an inflow of water into the trap-chamber. It will also be seen that the valved discharge-port will be opened to an extent proportional to the flow of water into the trap-chamber, and hence that the inflow and discharge will be equal, it being obvious that where the flow into the float is in larger quantity than herein illustrated the float will be caused to sink to such depth as will insure an open area of the discharge-port proportional to the inflow.

It will be noted that the float is an open float, and that, while it does not receive water through its open top, it can receive steam through the same, and also that by providing the float with a restricted side inlet-port there will be within the float a constant space not occupied by a certain body of water within the float and forming a constant steam-chamber below the level of the body of water wherein the float is suspended and supplied through the open top of the float from steam which enters the trap-chamber; also, that a balance-valve in conjunction with the float is essential to the foregoing described operation, since in practice if other constructions of valves not balance-valves are used the float, after sinking to a position to open the discharge-port, will be so held by steam-pressure. Thus I find by practical experiment that where a float is provided with restricted side portage and serving to operate a valve constructed similar to the valve herein shown, but having one side port only, the steam-pressure within the trap will cause the valve to bind, and thereby cause sufficient friction between the opposing operative bearing-surfaces of the valve to retard the descent of the float and require a greater weight of water to sink the latter than would be necessary if no such binding action were present. When, therefore, a valve is used which is not balanced by having diametrically-opposite ports, as illustrated in the drawings herein, the necessary sensitiveness of the working portion of the trap will be destroyed proportionally to the steam-pressure within the trap, it being a self-evident fact that if the valve has but one port the steam-pressure within the trap will of necessity in acting upon the unported portion of the valve destroy the balance. When the valve-port is open, the valve is, as a matter of course, at once relieved of the pre-existing pressure, and hence where the valve is provided with a single port, and consequently is not balanced, the accumulation of water in the float prior to the opening of the valve-port will be so large as to rapidly sink the float to the bottom of the trap as soon as the valve-port has opened, and thereby an intermittent action of the trap will be caused, in contradistinction to the steady non-intermittent action which I obtain proportional to and simultaneous with the inflow of water into the trap.

What I claim as my invention is—

1. A steam-trap comprising a receiving-chamber provided with a suitable inlet, an open float arranged within the receiving-chamber and provided with restricted side portage, substantially as set forth, for the inflow of water from the receiving-chamber into the float, and a balance discharge-valve operated by the float and formed with oppositely-arranged ports, through which the discharge from the float is effected proportional to and continuously during the flow of water into the receiving-chamber, substantially as described.

2. In a steam-trap, the open float provided with restricted side portage, through which the water enters the float, carried by a hollow vibratory arm for discharging from the float, and a balance-valve D, arranged for discharging from the hollow vibratory arm and constructed with bearing portions $d'$ $d^2$, arranged upon a hollow stem provided with ports $e$, a part annular passage $d^3$, and ports $d$, arranged diametrically opposite one another and respectively at opposite ends of passage $d^3$, which forms a prolongation of the passage through the hollow arm, substantially as described.

BYRON E. VAN AUKEN.

Witnesses:
CHAS. G. PAGE,
MARGARET M. WAGNER.